United States Patent [19]

Borzym

[11] Patent Number: 4,614,139

[45] Date of Patent: Sep. 30, 1986

[54] ROTARY LINK DRIVEN CUTOFF MACHINE

[75] Inventor: Alexander Borzym, West Bloomfield, Mich.

[73] Assignee: Alpha Industries, Inc., Novi, Mich.

[21] Appl. No.: 754,087

[22] Filed: Jul. 12, 1985

[51] Int. Cl.⁴ .................... B23D 21/00; B23D 25/04
[52] U.S. Cl. ........................................ 83/300; 83/54; 83/320
[58] Field of Search ................. 83/318–320, 83/300, 54

[56] References Cited

U.S. PATENT DOCUMENTS 3,921,484  11/1975  Rasenberger ................... 83/320
4,108,029  8/1978  Borzym ................................ 83/54
4,196,645  4/1980  Shimizu et al. ................... 83/320 X Primary Examiner—Frank T. Yost
Attorney, Agent, or Firm—Krass & Young

[57] ABSTRACT

A cutoff apparatus for tubing and the like wherein a single electric motor is used to accelerate the apparatus into synchronous movement with the tubing and is also used to power the cutoff apparatus during the work stroke. A rotary crank is connected to the output shaft of the motor and to a control linkage which substantially reduces the cutoff work stroke length while at the same time preserving substantially the entire acceleration travel distance.

4 Claims, 2 Drawing Figures

4,614,139

ROTARY LINK DRIVEN CUTOFF MACHINE

DESCRIPTION

INTRODUCTION

This invention relates to flying cutoff machines for moving stock such as tubing and more particularly to apparatus for deriving acceleration and work stroke power requirements from a single rotary power source.

BACKGROUND OF THE INVENTION

Flying cutoffs for tubing, roll-formed shapes and the like, typically comprise a die mechanism mounted on slides and powered by an accelerator for travel synchronously with and in the direction of the moving work. In addition, a separate power source such as a mechanical press is provided for actuating the die through the work stroke to sever the workpiece. See, for example, U.S. Pat. No. 3,288,011 issued Nov. 29, 1966 to Alexander Borzym.

Efforts have been made to combine the acceleration and work stroke functions so that they can be powered by a single source. One effort, believed to have been undertaken by Kusakabe of Japan, involves the use of a rotary power source and a crank on the end of the rotary power source output shaft. The circular-sweeping end of the crank is pivotally connected to the upper platen of a cutoff die set such that when the crank is rotated, the die set is caused not only to move with the work but is also opened and closed.

A substantial problem of stability and excessive work stroke results from the device just described. For example, assuming the crank is approximately 14 inches in length, the horizontal travel of the die set with the work is approximately 28 inches but the vertical travel of the upper platen in the work stroke direction is also 28 inches. This is substantially more work stroke travel than is actually required to cut tubing or the like and results in the necessity for die set construction which accomodates the excess work stroke and which provides stability over the entirety of this stroke.

SUMMARY OF THE INVENTION

The object of the present invention is to combine acceleration and work stroke power functions into a single source, preferably a rotary power source such as an electric motor and, at the same time, to substantially alter the ratio of horizontal travel to vertical travel in favor of reduced work stroke.

In general, this is accomplished by providing a rotary power source having a crank connected thereto and, in addition, a control linkage which interconnects the circular-sweeping end of the rotary crank with the movable platen of a flying cutoff apparatus, the control linkage serving to provide a closed loop path of travel which is non-circular; i.e., substantially compressed over the return stroke thereof to dramatically shorten the work stroke and increase the ratio of travel distance to work stroke. This facilitates simpler construction of the die set, enhances stability, reduces operating and maintenance problems and reduces the cost of the cutoff apparatus.

DETAILED DESCRIPTION OF THE ILLUSTRATIVE EMBODIMENT

Figure 1:
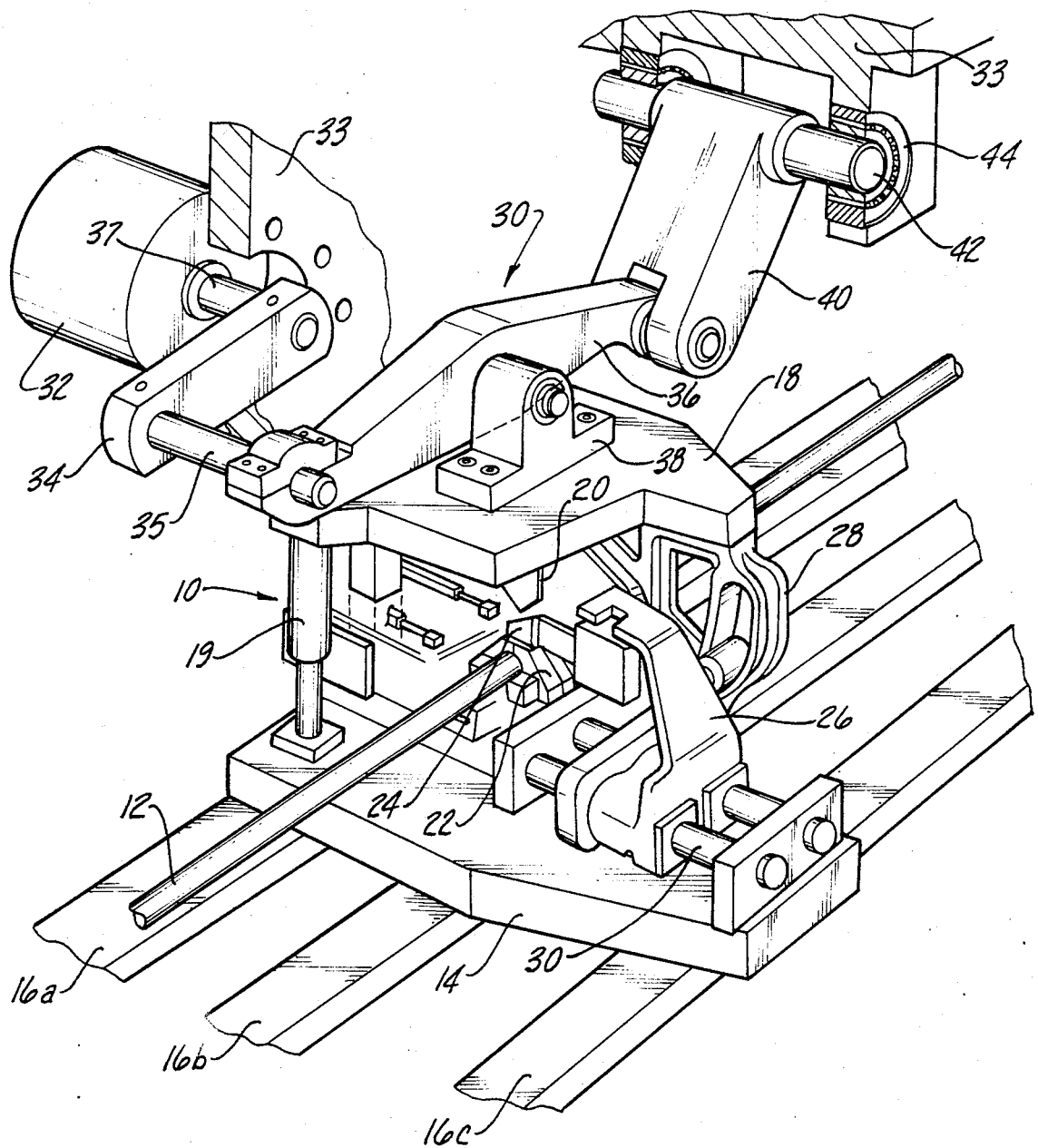
FIG. 1 is a perspective view with some parts broken away and some parts in section of a cutoff apparatus embodying the invention.

FIG. 1 of the drawing illustrates a flying cutoff apparatus 10, often called a flying cutoff die set, for small diameter tubing 12 which is moving in the direction of its own longitudinal axis as it emanates from a seam welder station in a tube mill. The overall function of the device shown in FIG. 1 is to sever the tubing 12 into selected lengths on the fly; i.e., without the necessity for periodically stopping the tube mill to accomodate the cutoff operation. The term "small diameter" is used herein to denote tubing between about one and six inches in diameter but these figures are exemplary rather than limiting.

Apparatus 10 comprises a base or lower platen 14 mounted on slides 16a, 16b and 16c which are oriented parallel to the axis of the tubing 12 and which permit the apparatus 10 to slide or travel with and in the direction of the tubing for a prescribed distance and then to return to an original or "home" position.

Apparatus 10 further comprises an upper platen 18 which is mounted on a plurality of guideposts 19, only one of which is shown, to permit controlled vertical reciprocation which is essential to the cutoff function. A cutoff blade 20 is suitably mounted to the underside of the upper platen 18 and passes downwardly with the upper platen 18 so that the plane of the blade 20 passes fully through a section of tubing 12 and between suitably operating clamping jaws 22. Where a dimple-free operation is desired, apparatus 10 further comprises a notching blade 24 mounted in a cross slide subassembly 26 mounted on pins 30 and operated by a vertical cam 28 to pull the blade 24 across the top of the tubing 12 to notch the tubing prior to the time-sequenced entry of the severing blade 20. Details of the apparatus 10 may be obtained from U.S. Pat. No. 4,108,029, issued Aug. 22, 1978 to Alexander Borzym and from U.S. Pat. No. 4,294,147 issued Oct. 13, 1981 to John J. Borzym.

A power source for the acceleration motion; i.e., the travel of the apparatus 10 along the slides 16 both with and against the direction of the tubing 12, and for providing the work stroke function; i.e., the vertical reciprocation of the upper platen 18, is provided in the form of a DC motor 32 mounted in a stationary machine frame 33 which carries and, hence, is fixed relative to the slides 16. Motor 32 has an output shaft connected to one end of a rotary crank 34, the length of which is slightly more than half of the desired travel distance of the apparatus 10 along the slides 16 in the acceleration and return direction. It can be seem from FIG. 1 and from FIG. 2 that the distal end of the crank 34 rotates through and describes a circular path representing the travel of the connector pin 35.

In accordance with the invention, the rotary crank 34 is connected via pin 35 to a control linkage 30 which in turn is connected to upper platen 18 and which operates to shape the path of travel of the platen 18 so that it is non-circular and so that the ratio of the slide direction travel to the cutoff travel of the apparatus 10 is substantially greater than 1:1.

Describing the control linkage 30 in detail, a rocker link 36 is pivotally connected at one end to the pin 35 and at the other end to a link 40. The fixed end of link 40 is connected via a pivot pin 42 mounted in bearings 44 to the machine base 33. The rocker link 36 is pivotally connected at approximately its mid-point to a bracket 38 on the upper platen 18.

Figure 2:
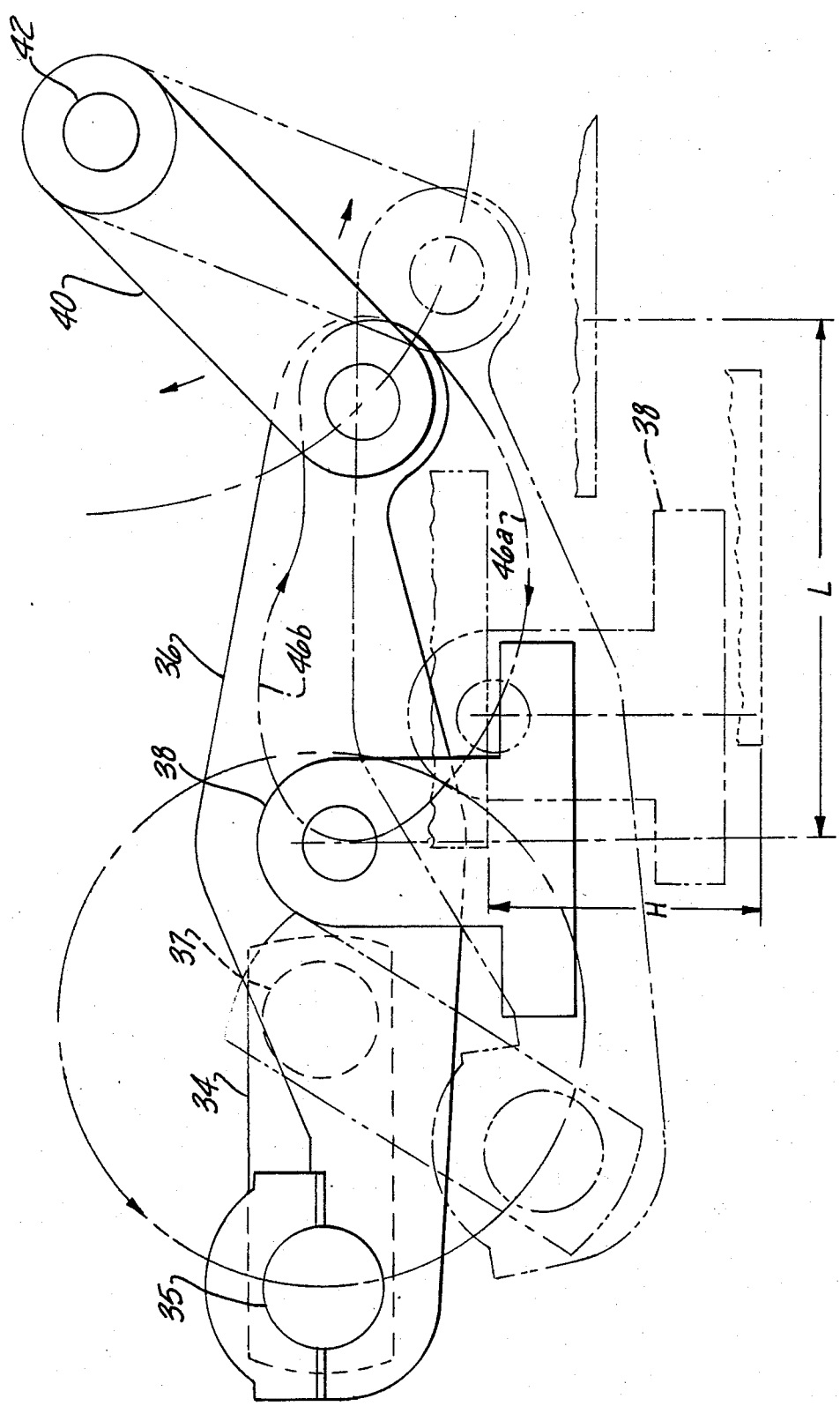
FIG. 2 is a diagramatic side view of the control linkage in the device of FIG. 1 illustrating the improved travel path and substantially improved travel distance to work stroke ratio.

The overall operation and improvement relative to prior devices is best shown in FIG. 2. Again describing the prior art, a 14 inch length between pivot centers for crank 34 would result in a circular path of travel having a 28 inch diameter for any platen assembly connected directly thereto. This clearly results in approximately 28 inches of travel in both the acceleration direction and in the vertical work stroke direction. This is highly undesirable as the work stroke for normal tubing cutoff operations need be only on the order of about five to ten inches. Excessive work stroke length requires very long guideposts and extreme and costly measures to provide stability. On the other hand, the longer portion of the travel path described by the output pin 35 of the crank 34 is desirable for the acceleration travel of the apparatus 10 along slides 16.

As shown in FIG. 2 the bracket 38 and hence the upper platen 18 of the apparatus 10 goes through a closed loop path 46, the lower portion of which is essentially circular and of long radius; i.e., of a radius substantially equal to the working radius of the crank 34. This portion of the path is labelled 46a and produces an acceleration travel length L. However, it can further be seen in FIG. 2 that the result of the control linkage 30 is to dramatically compress and render non-circular the return path 46b so that the total vertical travel is reduced to the stroke length H. By proper selection of pivot points and linkage lengths, a cutoff system having an acceleration travel length L of between 25 and 30 inches and a stroke height of between 5 and 10 inches can be obtained.

The invention thus preserves the operating advantages of a single rotary power source to both accelerate and operate the apparatus 10 during the cutoff stroke but which totally eliminates the disadvantage of prior art in generating an excessive work stroke. It is to be understood that the invention may be applied to various types of cutoff apparatus either with or without the dimple-free notching feature, with various cutoff blade configurations and for use in connection with the severing, perforating, punching or shaping of a variety of workpieces including, not only tubing, but roll-formed materials, shapes, strip materials and other workpieces which emanate from a fabrication facility.

I claim:

1. Apparatus for operating a flying cutoff for moving stock such as tubing comprising:
   cutoff means movable as unit with the stock and having platen means movable transversely of said stock for performing a severing function;
   rotary power means;
   crank means connected to the rotary power means;
   control linkage means interconnecting the crank means with the platen means for producing a closed loop, non-circular motion path thereof such that the ratio of the travel distance of the cutoff means with the work to the travel of the platen means transverse to the work is greater than 1;
   said control linkage comprising a pair of pivotally interconnected intermediate links, one end of which is fixed in position relative to said rotary power means and the other which is connected to said crank means; and
   means connecting an intermediate point of one of said links to said platen means.

2. Apparatus as defined in claim 1 wherein the closed loop motion path is essentially kidney-shaped.

3. Apparatus as defined in claim 1 wherein said cutoff means comprises a cutoff blade for severing the tubing, said blade being connected to said platen means for movement therewith.

4. Apparatus as defined in claim 3 wherein said cutoff means further comprises a notching blade and means interconnected with said platen means for causing said notching blade to notch said stock prior to severing by said cutoff blade.

* * * * *